United States Patent [19]

Stehle

[11] 4,187,157

[45] Feb. 5, 1980

[54] METHOD AND APPARATUS FOR ISOTOPE CONCENTRATION

[75] Inventor: Heinz Stehle, Marloffstein, Fed. Rep. of Germany

[73] Assignee: Kraftwerk Union Aktiengesellschaft, Mülheim, Fed. Rep. of Germany

[21] Appl. No.: 608,703

[22] Filed: Aug. 28, 1975

[30] Foreign Application Priority Data

Sep. 10, 1974 [DE] Fed. Rep. of Germany ....... 2443216

[51] Int. Cl.² ........................... B01J 1/10; B01K 1/00
[52] U.S. Cl. ..................... 204/157.1 R; 204/DIG. 11; 250/527
[58] Field of Search ................ 204/157.1 R, DIG. 11; 250/282, 527

[56] References Cited

FOREIGN PATENT DOCUMENTS 1284620 8/1972 United Kingdom ............ 204/DIG. 11

OTHER PUBLICATIONS

Letokhov, Science, vol. 180, No. 4085 (May 4, 1973), pp. 451–453.

Primary Examiner—Howard S. Williams
Attorney, Agent, or Firm—Kenyon & Kenyon

[57] ABSTRACT

A desired isotope mixed with one or more other isotopes is selectively excited by laser radiation absorbed by only that isotope, so that that one isotope selectively enters into a chemical reaction with a reaction partner fed to the mixture. The desired selectivity can be degraded here by thermally activated reactions between the other isotopes and the partner. To avoid this effect, the mixture and partner in the necessary reaction vessel are irradiated for one or more short time intervals after each of which the vessel's content is adiabatically emptied into a vacuum vessel. Each time interval may be made short enough to avoid the thermal activation.

4 Claims, 2 Drawing Figures

METHOD AND APPARATUS FOR ISOTOPE CONCENTRATION

BACKGROUND OF THE INVENTION

The present invention concerns a method and apparatus for concentrating isotopes by means of laser radiation having a wave length absorbed only by molecules of a desired isotope mixed with one or more other isotopes, and these molecules, excited thereby, are caused to enter into a chemical reaction with a reaction partner. Such a method has become known, for instance, from the German Auslegeschrift No. 2,296,355. Here, a laser beam of a frequency which corresponds to an absorption frequency of the isotope to be excited, passes through the mixture of isotope molecules and a reaction partner. This selectively excited isotope molecule is thereby enabled to enter into a chemical reaction with a suitable reaction partner, so that essentially only the excited isotope is contained in the reaction product and, thereby, a separation from the mixture or enrichment of the same as to the desired isotope and with respect to the original isotope mixture, is achieved.

Besides these desired reactions, however, also thermally activated reactions occur which are not tied to the molecules of the one isotope excited by the laser radiation, so that the selectivity of the method is degraded thereby. This possibility exists particularly if the activation energy necessary to carry out the chemical reaction, is relatively low.

Since the efficiency of a separation method, however, depends very heavily on its selectivity, the problem arose to find a way to carry out a method of isotope separation of this kind, in which the "thermal competition", i.e., the undesired reactions due to thermal activation, are kept as low as possible.

SUMMARY OF THE INVENTION

According to the present invention, this objective is reached by the provision that the isotope mixture as well as the reaction partner are admitted in measured amounts from supply vessels, into a reaction vessel, a laser beam of high dose rate is then sent briefly through the reaction vessel and, subsequently, the content of the reaction vessel is emptied adiabatically into a vacuum vessel. The process is thus controlled in individual cycles, the individual cycles, particularly the irradiation cycle, being limited in time in such a manner that thermal activation of the substances contained in the reaction vessel and therefore, the undesired reactions, are avoided. By discharging the content of the reaction chamber, after the irradiation has been carried out, into a vacuum vessel, adiabatic decompression of the irradiated content takes place which is accompanied by such a rapid cooling-down effect such that thermal activations become immediately ineffective.

BRIEF DESCRIPTION OF THE DRAWINGS

This method will now be explained in detail by way of example with the aid of a schematic presentation of the separation of an isotope mixture of $UF_6$, illustrated by the accompanying drawings, in which.

DETAILED DESCRIPTION OF THE INVENTION

Figure 1:
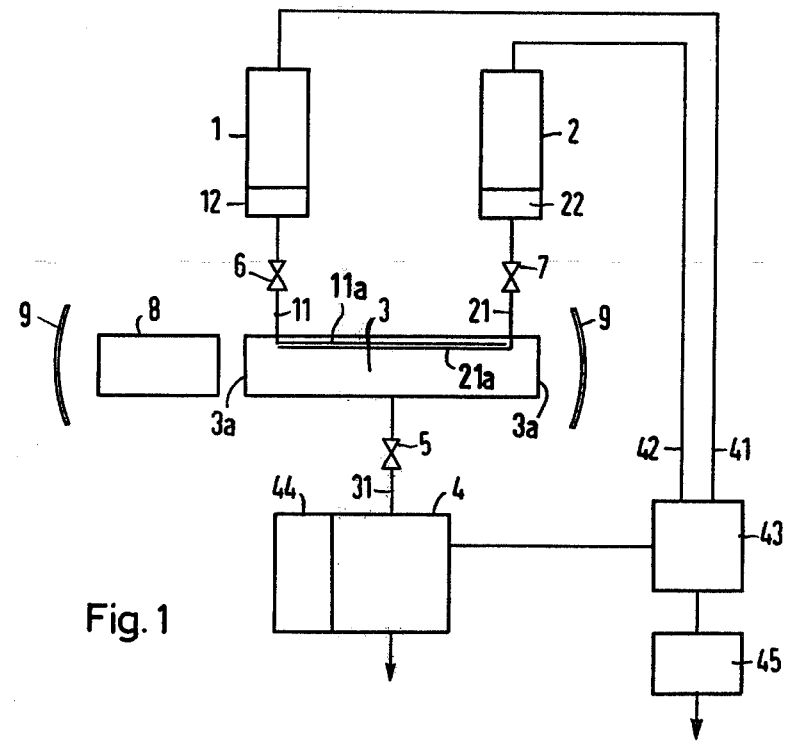
FIG. 1 shows schematically the interrelation of the devices which can be used for implementing the method.

The active part of a laser 8, e.g., a CO laser, and the reaction vessel 3 having end windows 3a, in which the desired chemical reaction between the excited isotope and the reaction partner takes place, are located within a mirror system 9 and, therefore, together form an optical resonator. This is advantageous to obtain an irradiation power as high as possible. The optical resonator is tuned here by technically known means to a single spectral absorption line of the isotope molecule to be excited. These means as well as arrangements for laser frequency tuning are not the subject of this invention and are therefore not shown; also, they are omitted for reasons of clarity.

The isotope mixture $UF_6$ is in a supply vessel 1, and the reaction partner such as HBr or HCl, is in the supply vessel 2. Both vessels are equipped with metering devices 12 and 22 of a type, which can feed accurately dosed amounts of these just described substances to the reaction vessel 3 via valves 6 and 7. These metering devices may be equipped here with heating or cooling devices (not shown) for adjusting to the most favorable temperature, substances to be reacted with each other.

Figure 2:
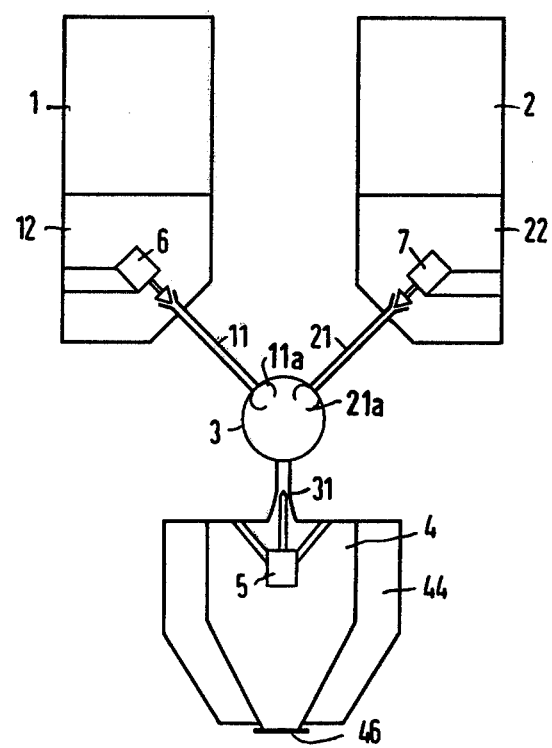
FIG. 2 shows a cross section perpendicularly to the optical axis of the irradiation vessel which is shown, so to speak, in a side view of FIG. 1.

The feed lines 11 and 21 to the reaction vessel 3 are provided here as longitudinally slit nozzles 11a and 21a which extend practically over the entire length of the reaction vessel 3. This is shown comparitively somewhat more realistically in FIG. 2, where, in addition, the valves 6 and 7 are shown as being arranged inside the metering devices 12 and 22. As previously noted, devices for adjusting temperature are not shown, for the sake of clarity. The reaction vessel is advantageously designed as a tube which closely surrounds the laser beam, so that the largest possible percentage of the substances located in the reaction vessel, are exposed to the action of the laser beam.

According to this new method, appropriately metered volumes of the $UF_6$ and a suitable partner, such as referred to before, are fed into the reaction vessel 3, the slit nozzles promoting a thorough intermixing of the two. Then the laser 8 is activated for a time interval long enough for the effective activation of the U235 isotope, but short enough to avoid thermal activation of the vessel's contents such as might effect undesired reactions between the partner and the other isotopes in the mixture of isotopes. Then via a slit-type nozzle 31, which can be promptly opened via a valve 5, e.g., magnetically, the irradiated mixture of substances, without heating or cooling, is decompressed into the vacuum chamber 4 and there is cooled very heavily and rapidly in the process, so that thermal reactions cannot occur. The vacuum in the collecting vessel 4 is preferably generated cryotechnically, i.e., by freezing-out. The apparatus required therefor, such as a jacket for cryogenic substances, is schematically designated with 44.

If the desired reaction product is precipitated in solid form, it remains in the vacuum vessel 4 and can be removed therefrom from time to time through a trap door 46. This solid reaction product is then converted again by chemical means in steps, not shown, into $UF_6$ with a U235 content substantially higher than in the original $UF_6$, and is then processed into $UO_2$ in the conventional manner.

The remaining part of the starting substances gets at given time intervals, to a separating equipment 43 which may operate, for instance, according to the principle of fractional distillation where the separated parts comprising the original isotope mixture and the reaction partner can then be returned to the respective supply vessels via the lines 41 and 42.

In the case that the reaction product is not precipitated within the vacuum vessel 4 in solid form, it is transferred by means of the already mentioned separation equipment 43 into a conversion device 45 which converts the reaction product back into the starting material $UF_6$ and thereby makes it suitable for further processing, for instance, into $UO_2$. The $UF_6$ is then enriched with the irradiated isotope, e.g., uranium 235. Should the degree of enrichment obtained with a single pass not yet be sufficient, it is possible to feed also this already enriched $UF_6$ back to the supply vessel 1 again and to subject it to another separating step. Various substances can be used here as reaction partners. For this example, $UF_6$, one can use, for instance, HBr of HCl, as previously indicated.

The cycle of this process can be advantageously controlled by a control unit (not shown) which also sets the desired values for the heating and cooling devices (not shown). The internal design of the control unit may be conventional; thus it is not shown specifically, especially since it is not necessary for the understanding of the present invention.

In conclusion, it should be pointed out that this method is, of course, suitable for other substance, not only for the separation of isotopes of uranium, and it is also not absolutely necessary to integrate the reaction vessel with the optical resonator, but a radiation energy as high as possible, which is available for a short time, is essential. Technically known pulsed laser circuits can therefore be used. It should further be mentioned that it is also possible, of course, to contain higher degrees of concentration by further separating devices arranged in cascade-fashion.

What is claimed is:

1. An isotope concentration method wherein one isotope is separated from a mixture including that one isotope and at least one other isotope, by subjecting the mixture to irradiation with laser radiation exciting at least mainly only said one isotope and while the mixture is mixed with a chemical partner which chemically reacts with said one isotope when it is thus excited, said other isotope being chemically reactive with said partner when sufficiently thermally activated; wherein the improvement comprises limiting the duration of said irradiation to a time period short enough to prevent thermal activation of said mixture to a degree causing said other isotope to chemically react with said partner but long enough to excite said one isotope to a degree causing it to react with said partner, said mixture and said partner being mixed and irradiated while in a reaction vessel, and immediately after the reaction between said one isotope and the chemical partner and before any substantial thermal activation of said mixture the contents of the vessel being emptied adiabatically into an evacuated chamber.

2. The method of claim 1 in which the contents of the evacuated chamber are removed from the chamber and separated into said mixture and said partner which are returned to said reaction chamber and recycled for separation of further amounts of said one isotope.

3. An apparatus for use in the concentration of one isotope in a mixture of that one isotope and at least one other isotope and comprising a reaction chamber, means for introducing into said chamber said mixture and a chemical partner for said one isotope, and laser means for irradiating said mixture and partner while in said chamber; wherein the improvement comprises said laser means being a means for providing a high-intensity laser radiation of short duration, and said reaction chamber has a collecting chamber and means for adiabatically transferring contents of the reaction chamber to said collecting chamber, the latter chamber having means for effecting its evacuation.

4. The apparatus of claim 3 in which said improvement additionally comprises said laser means and said reaction chamber being integrated to form an optically resonant laser system.

* * * * *